(12) United States Patent
Muller

(10) Patent No.: US 6,315,472 B1
(45) Date of Patent: Nov. 13, 2001

(54) ERGONOMIC KEYBOARD DEVICE

(76) Inventor: Catrina Muller, 211 Balfield Ter., Cherry Hill, NJ (US) 08003

( * ) Notice: Subject to any disclaimer, the term of this patent is extended or adjusted under 35 U.S.C. 154(b) by 0 days.

(21) Appl. No.: 09/584,897

(22) Filed: May 25, 2000

(51) Int. Cl.[7] .................................................... B41J 5/08
(52) U.S. Cl. ............................................. 400/472; 400/91
(58) Field of Search ................................... 400/472, 473, 400/482, 496, 98, 99, 100, 101, 102, 91, 92, 93, 94; 341/21, 22; 361/679, 680; 235/145 R, 146

(56) References Cited

U.S. PATENT DOCUMENTS

| D. 370,669 | 6/1996 | Hargreaves et al. | 400/109 |
|---|---|---|---|
| 3,073,427 | * 1/1963 | Gremillet | 197/7 |
| 3,945,482 | 3/1976 | Einbinder | 197/100 |
| 4,244,659 | 1/1981 | Malt | 400/486 |
| 4,307,970 | * 12/1981 | McGaughey, Jr. et al. | 400/482 |
| 4,310,254 | 1/1982 | D'Angiolillo et al. | 400/109 |
| 4,564,751 | * 1/1986 | Alley et al. | 235/146 |
| 4,579,470 | 4/1986 | Casey | 400/489 |
| 4,661,005 | 4/1987 | Lahr | 400/489 |
| 5,017,030 | 5/1991 | Crews | 400/485 |
| 5,395,178 | * 3/1995 | Chvojcsek | 403/349 |
| 5,426,449 | 6/1995 | Danziger | 345/168 |
| 6,186,460 | * 2/2001 | Lin | 248/284.1 |
| 6,266,234 | * 7/2001 | Leman | 361/680 |

* cited by examiner

Primary Examiner—John S. Hilten
Assistant Examiner—Darius N. Cone
(74) Attorney, Agent, or Firm—Caesar, Rivise, Bernstein, Cohen & Pokotilow, Ltd.

(57) ABSTRACT

An ergonomic keyboard assembly arranged for providing input to an existing keyboard device having a plurality of keys that are moveable relative to a frame. The ergonomic keyboard comprises means for attaching the ergonomic keyboard assembly to the existing keyboard device. The ergonomic keyboard assembly further comprises a plurality of keys mounted to the support surface, the keys being arranged in first and second key sections. The first key section carries thereon keys adapted for operation by fingers of one of the operator's right and left hands. The first key section is spatially separated from the second key section. The second key section carries thereon keys adapted for operation by fingers of the other of the operator's right and left hands. The ergonomic keyboard assembly also comprises a plurality of actuation mechanisms respectively linked with the plurality of keys mounted to the support surface. The actuation mechanisms have respective hammers each driven along a trajectory so as to strike one of the plurality of keys on the existing keyboard when an associated one of the plurality of keys mounted to the support surface is depressed.

9 Claims, 7 Drawing Sheets

ERGONOMIC KEYBOARD DEVICE

BACKGROUND OF THE INVENTION

The basic stenographic recording machine mechanism today used by court reporters has changed little since the invention of the machine over 40 years ago. Modern stenographic recording machines have adapted the basic mechanism to digital computer technology. However, despite the addition of such technology, the basic mechanical mechanism remains essentially intact with no innovations being made to address repetitive stress injuries that can result from frequent and prolonged use of such devices.

Frequent use of stenographic keyboards can result in injuries due to the unnatural angle the hands are required to assume to operate the keyboard of the existing stenographic recording machine when typing. An operator of a conventional stenographic keyboard must rotate his or her arms so as to dispose the hands in a palms-down position, by pronation, and align the fingers with the rows of keys by twisting each hand outwardly at the wrist, by ulnar deviation. Conventional stenographic keyboards can result in the operator's arm and hand muscles functioning poorly and increasing risks of injury. Tendons and nerves are adversely affected, and over time, this abuse can lead to repetitive stress injuries such as carpal tunnel syndrome. Symptoms of carpal tunnel syndrome are shooting pains from the wrists to the forearms, palms or fingers. In extreme cases, carpal tunnel syndrome is permanently debilitating. In a significant number of cases, repetitive stress injuries have forced court reporters and other workers which frequently use a stenographic keyboard to an alternative type of employment that does not require use of any keyboard.

This invention relates generally to ergonomic keyboard devices and more particularly to an ergonomic keyboard assembly that is arranged for providing input to a stenographic keyboard. The present invention allows an improved and more natural hand and arm position while typing, thereby reducing repetitive stress injuries such as carpal tunnel syndrome. To reduce the occurrence of carpal tunnel syndrome and other repetitive stress injuries, a keyboard should alleviate the underlying causes of repetitive stress injuries. Such an improved keyboard, which is realized in the present invention, relieves muscle and tendon strain, lessens or reduces wrist deviation, reduces or eliminates forearm pronation, reduces the distance fingers must travel and lessens the force necessary to the keys.

A number of prior art keyboard designs have been proposed in an attempt to reduce repetitive stress injuries. For example, U.S. Pat. No. 5,426,449 (Danziger) discloses an ergonomic keyboard featuring a front keypad facing the operator and left and right keypads that are at approximately a 45 degree angle positioned in tripod fashion substantially forming a pyramid with the front keypad. U.S. Pat. No. 5,017,030 (Crews) discloses an ergonomically designed keyboard usable on a typewriter or a compute terminal that is configured in accordance with ergonomic principles using chording of one thumb and one finger to type the characters of the English alphabet. The keyboard includes right and left pre-loaded palm pads which are shaped and contoured to fit the hands. The palm pads support the hands and operate the SHIFT and SHIFT LOCK functions. The punctuation keys are not affected by the SHIFT function. Movement of the writing position or cursor with respect to the medium is controlled by thumb-operated keys which are pushed in the direction of the desired movement. U.S. Pat. No. 4,661,005 (Lahr) discloses a design wherein the conventional QWERTY keyboard layout is split into two separate pieces allowing the operator to space each horizontal keypad at a comfortable interval. U. S. Pat. No. 4,579,470 (Casey) discloses a keyboard with keys concentrated in clusters in such a manner so as to be operated by specific fingers designated for specific clusters. Keys are clustered and clusters arranged to allow rapid finger motion with little hand motion. The keyboard arrangement also allows the hands and arms to be positioned in a natural manner in relation to the body. U.S. Pat. No. 4,244,659 (Malt) discloses a typewriter keyboard arranged to take into account the frequency of occurrence of letters so that the keys for the most frequently occurring letters are positioned for easiest operation by the typist. U. S. Pat. No. 3,945,482 (Einbinder) discloses orthogonal ten-finger keyboards for typewriters, computer terminals, and other devices processing alphanumeric information that maximize entry rates and stroking accuracy and minimizes finger motions and the time needed to master the keyboard.

While the aforementioned patents may be suitable for their intended purposes, the keyboards disclosed in these patents are arranged to replace existing keyboards that are utilized in conjunction with electric or electronic typewriters, word processors or computer input terminals. In other words, none are arranged for actuation of an existing keyboard device such as the mechanical keyboard utilized on a stenographic recording machine. It would be a significant advance in the art to provide an ergonomic keyboard that is arranged for providing input to an existing keyboard device such as a stenographic keyboard.

OBJECTS OF THE INVENTION

Accordingly, it is a general object of this invention to provide an ergonomic keyboard device that overcomes the disadvantages of prior art ergonomic keyboards.

It is a more specific object of this invention to provide an ergonomic keyboard device that allows the hands and arms to be positioned in a natural manner in relation to the body.

It is a more specific object of this invention to provide an ergonomic keyboard device that allows rapid finger motion with little hand motion.

It is also a specific object of this invention to provide an ergonomic keyboard device that may be utilized to actuate a stenographic keyboard.

It is also a specific object of this invention to provide an ergonomic keyboard device that may be quickly and easily attached to and removed from an existing stenographic recording machine.

It is also a specific object of this invention to provide an ergonomic keyboard device which is portable.

It is also a specific object of this invention to provide an ergonomic keyboard device which is simple in construction.

It is also a specific object of this invention to provide an ergonomic keyboard device which is reliable in operation and easy to use.

SUMMARY OF THE INVENTION

These and other objects of this invention are achieved by providing an ergonomic keyboard assembly arranged for providing input to an existing keyboard device having a plurality of keys that are moveable relative to a frame. The ergonomic keyboard assembly comprises means for attaching the ergonomic keyboard assembly to the existing keyboard device. The ergonomic keyboard assembly further comprises a plurality of keys mounted to the support surface, the keys being arranged in first and second key sections. The first key section carries thereon keys adapted for operation by fingers of one of the operator's right and left hands and is spatially separated from the second key section. The second key section carries thereon keys adapted for operation by fingers of the other of the operator's right and left hands. The ergonomic keyboard assembly also comprises a plurality of actuation mechanisms respectively linked with the plurality of keys mounted to the support surface. The actuation mechanisms have respective hammers each driven along a trajectory so as to strike one of the plurality of keys on the existing keyboard when an associated one of the plurality of keys mounted to the support surface is depressed.

In a variation of the disclosed embodiment, the ergonomic keyboard assembly additionally includes a housing comprising an upper portion, a lower portion, a front edge closest to the operator and a rear edge, the housing including the support surface disposed in the lower portion.

In another variation of the disclosed embodiment, the upper portion of the housing further comprises wrist support pads disposed on the top surface thereof and extending towards the front edge for reducing stress and tension.

In another variation of the disclosed embodiment, the existing keyboard device is a stenographic keyboard device.

In another variation of the disclosed embodiment, the actuation mechanism comprises an input arm, an output arm and a cable connecting the input arm with the output arm, the hammers being integral with each of the output arms.

In another variation of the disclosed embodiment, each cable comprises a first end and a second end with cable stops disposed on the first and second ends.

In another variation of the disclosed embodiment, the plurality of keys mounted to the support surface are arranged in a plurality of parallel rows.

DESCRIPTION OF THE DRAWINGS

Other objects and many attendant features of this invention will become readily appreciated as the same becomes better understood by reference to the following detailed description when considered in connection with the accompanying drawings wherein.

DETAILED DESCRIPTION OF THE PREFERRED EMBODIMENTS

Figure 1:
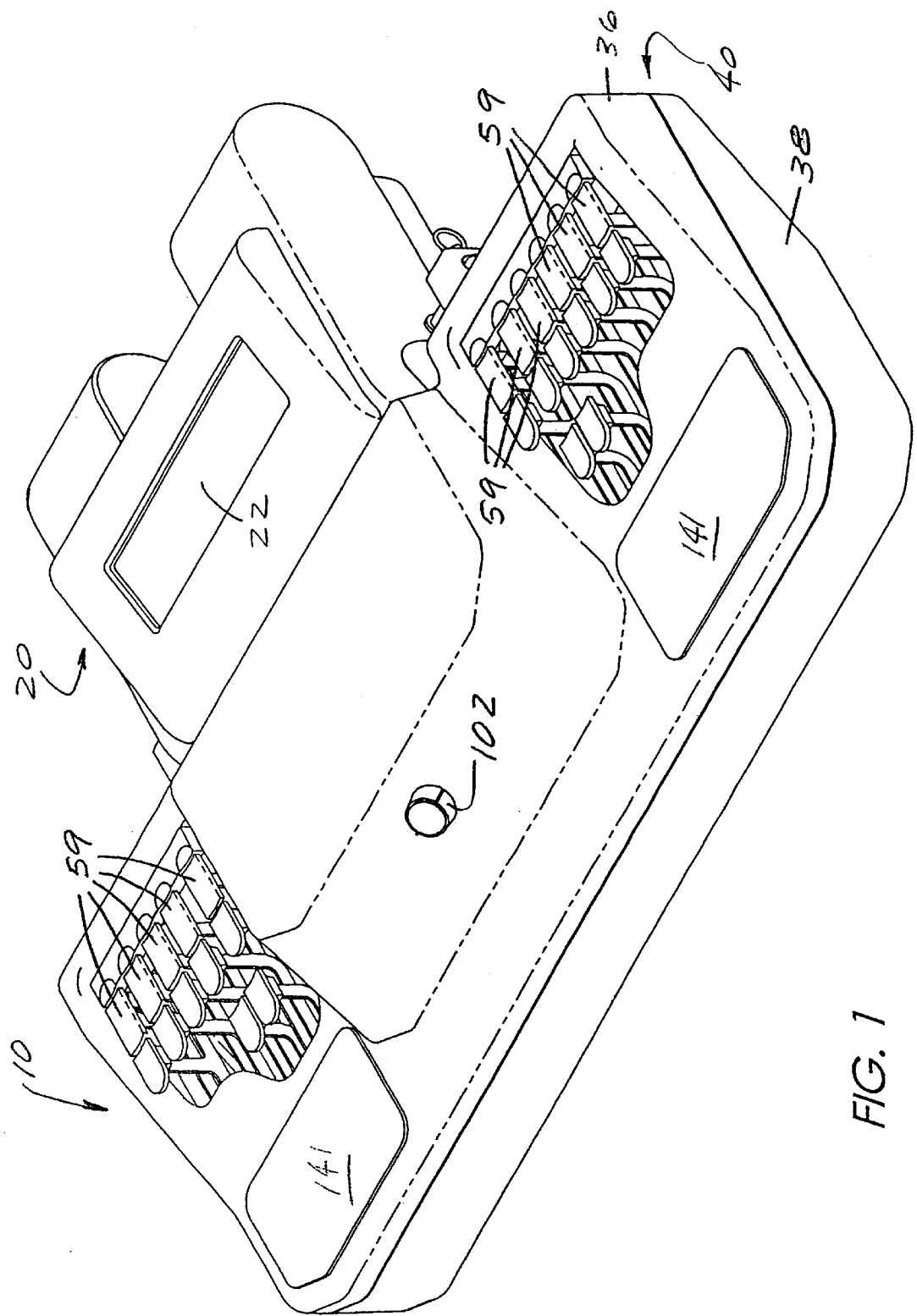
FIG. 1 is an isometric view of the ergonomic keyboard device of the present invention attached to a stenographic recording machine.
Figure 2:
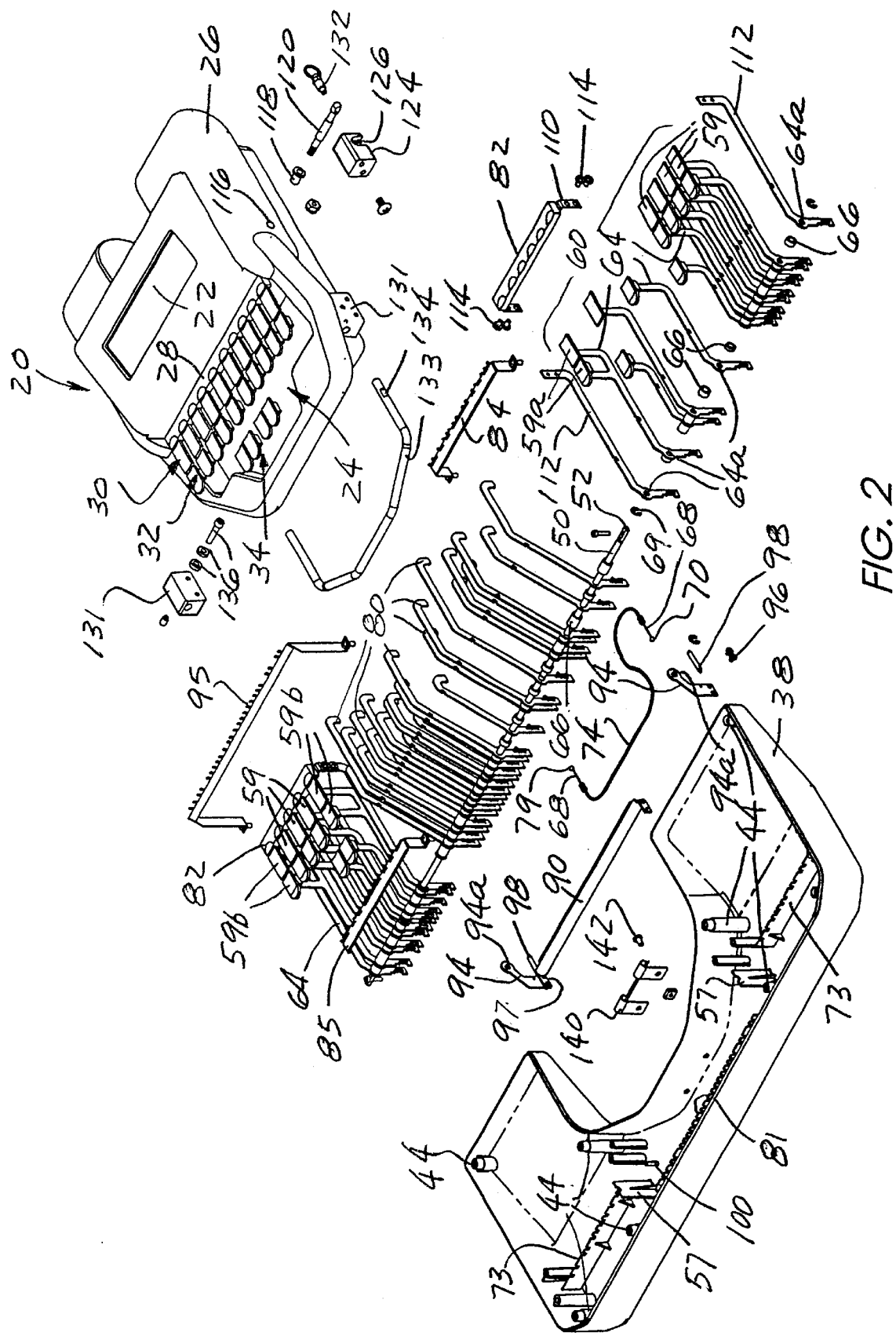
FIG. 2 is an exploded view of the ergonomic keyboard device of the present invention illustrating the manner for attaching the device to the stenographic recording machine.

Referring now to the various figures of the drawing wherein like reference characters refer to like parts, there is shown at 10 in FIG. 1 a first embodiment of the ergonomic keyboard device installed on a stenographic recording machine 20. The stenographic recording machine 20 is utilized by a court reporter or stenographer for creating a transcript which is a word-for-word account of questions asked and responses given during a court proceeding or an out-of-court proceeding such as a deposition. As best shown in FIGS. 1 and 2, the stenographic recording machine 20 includes an LCD display 22, a keyboard 24 and a housing 26. In use, in response to the manipulation of a particular key on the keyboard 24, a type bar element (not shown) emerges from the housing 26 and impresses a portion of an endless inked ribbon (not shown) against a print medium (not shown). As best shown in FIG. 2, the keys of the stenographic recording machine 20 are arranged in an upper number bar 28, an upper horizontal row 30 of rectangle-shaped keys, a second horizontal row 32 of keys having rounded bottoms and a lower horizontal row 34 of keys having rounded bottoms.

Figure 3:
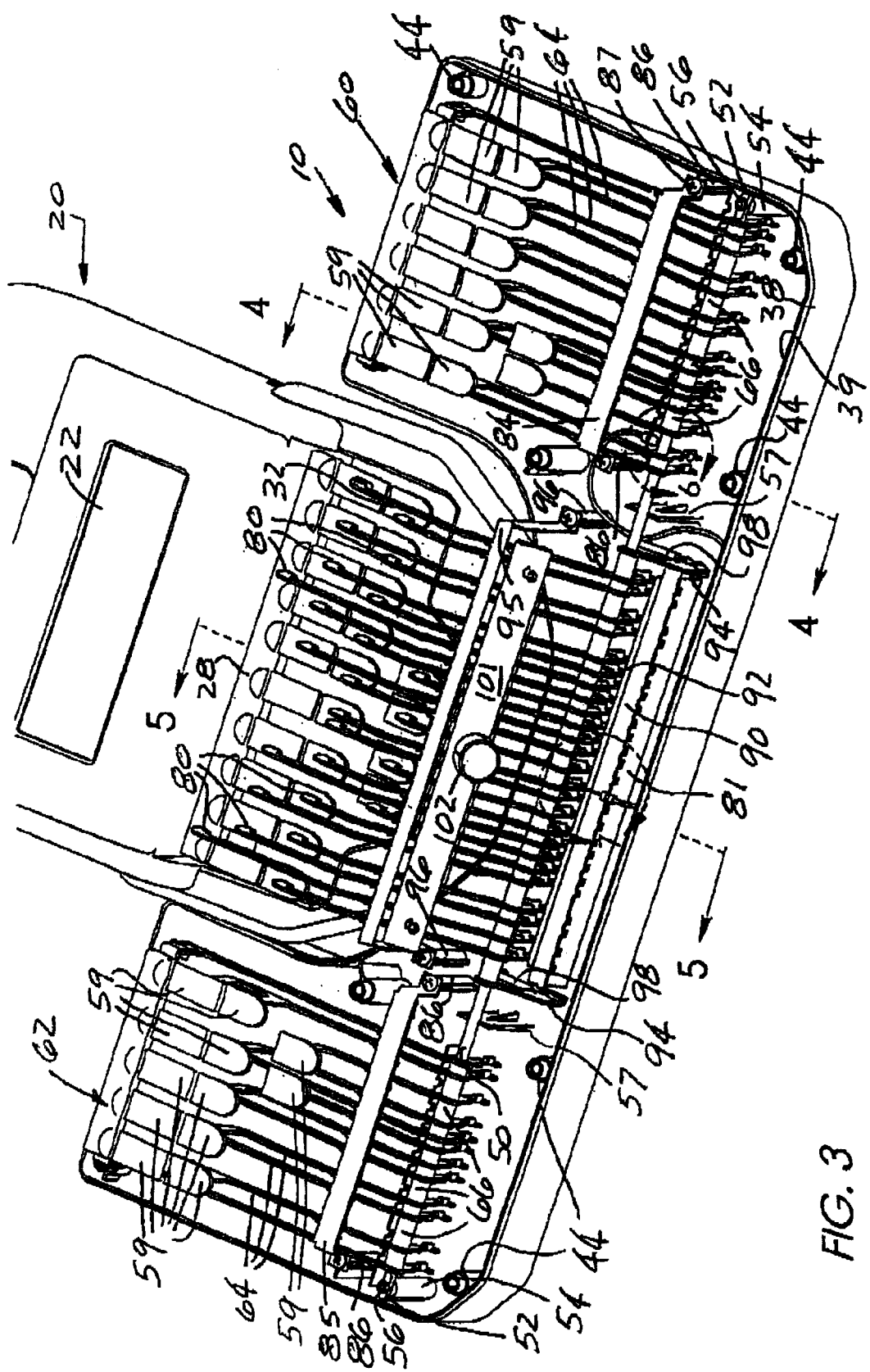
FIG. 3 is a view of the ergonomic keyboard device of the present invention with its cover removed and attached to a stenographic recording machine to illustrate its operation.

Referring now to FIG. 1, the ergonomic keyboard device 10 of the present invention includes a housing 40 that includes an upper shell 36 that is arranged to fit over a lower shell 38. As best seen in FIGS. 2 and 3, the lower shell 38 is provided with a plurality of upstanding bosses 44, each boss 44 being molded into the lower shell 38 and located to correspond with one of a plurality of bosses (not shown) located in the upper shell 36.

Figure 4:
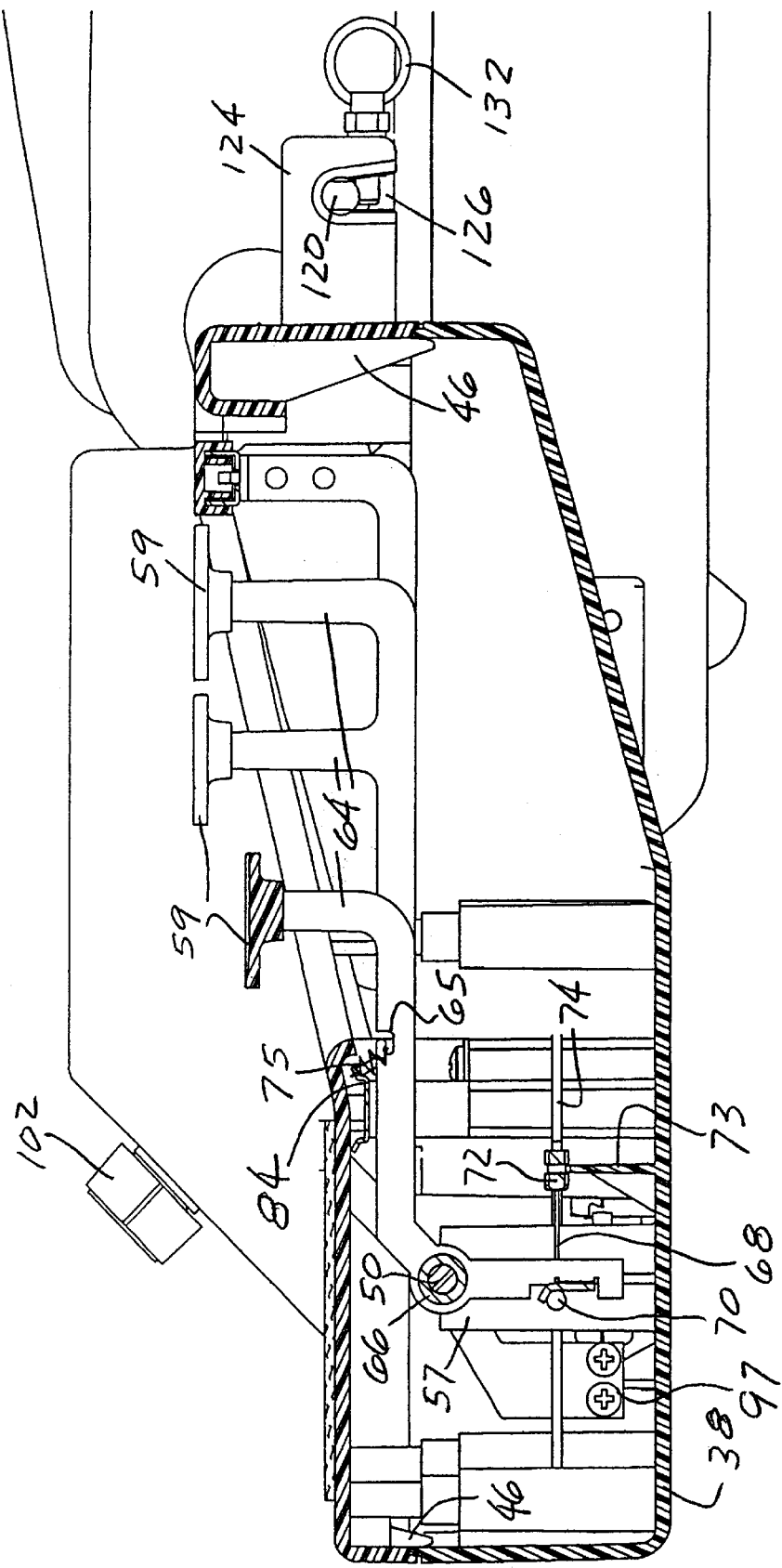
FIG. 4 is a sectional view taken through line 4—4 of FIG. 3.

As best shown in FIG. 3, the lower shell 38 is provided with an inner ridge 39 along its periphery to enable the upper and lower shells to fit together in a tongue-in-groove manner to give the appearance of one integral shell when fitted together. Once fitted together, the upper and lower shells 36 and 38, may be affixed to each other using any suitable securing hardware, e.g., threaded screws, extending upwardly through the upstanding bosses 44 located in the lower shell 38 and into the threaded bosses (not shown) located in the upper shell 36. Referring now to FIG. 4, the upper shell 36 is provided with a plurality of internal ribs 46 that actually extend downwardly slightly beyond the parting line of the upper shell 36. The ribs 46 are provided for alignment of the upper and lower shells to prevent inward movement of the lower shell 38 with respect to the upper shell 36.

Referring now to FIGS. 2 and 3, a rod-like pivot shaft 50 spanning almost the entire length of the lower shell 38 is fixedly secured within the lower shell 38. As best shown in FIG. 3, the pivot shaft 50 is cylindrical along its length and is provided with flats 52 at its opposite ends. The flats 52 are provided with through openings to enable fixed securement of the pivot shaft 50 to upwardly extending bosses 54 molded within the lower shell 38, the bosses 54 having threaded inserts disposed thereon. Fixed securement of the pivot shaft 50 within the lower shell 38 is accomplished by any suitable means, e.g., passing socketed cap screws 56 through the openings provided at the flattened ends 52 of the pivot shaft 50 and into the upwardly extending bosses 54. Securement of the pivot shaft 50 in this manner prevents rotational movement of the pivot shaft 50 along its longitudinal axis during use of the ergonomic keyboard device of the present invention. Support ribs 57 molded into the lower shell 38 extend upwardly therefrom to provide additional support for the pivot shaft 50 at evenly spaced intervals along the length of the pivot shaft 50 in order to minimize flexing of the pivot shaft 50.

Referring now to FIGS. 2 and 3, the ergonomic keyboard device 10 of the present invention is provided with a plurality of keys 59 that are arranged into two sets, i.e., a right set of input keys, indicated generally at 60 (FIG. 3), and a left set of input keys, indicated generally at 62. If the right set 60 and left set 62 of input keys were placed together, they would be arranged in the conventional keyboard distribution as is found on the keyboard 24 of the stenographic recording machine 20 shown in FIG. 2. However, as shown in FIG. 3, the input keys of the ergonomic keyboard device 10 are split into two different sets, i.e., the right set 60 and the left set 62. The right set 60 is disposed to the right of the stenographic recording machine 20 while the left set 62 is disposed to the left side of the stenographic recording machine 20. In other words, the stenographic recording machine 20 is disposed between the right set 60 and left set 62 of keys. When split in this manner, the keyboard arrangement of the present invention reduces stress and tension experienced by a human stenographer or court reporter during a court proceeding or an out-of-court proceeding such as a deposition.

Figure 6:
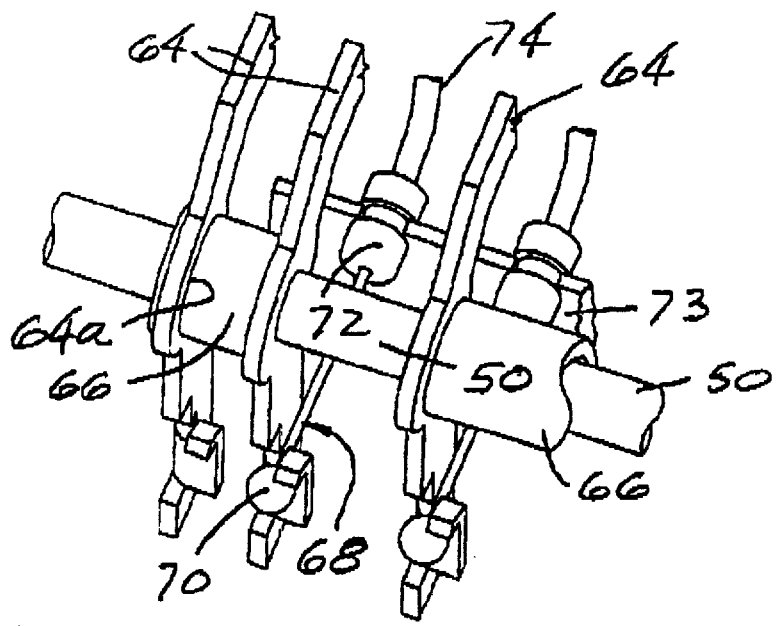
FIG. 6 is a detailed view of the area circled and labeled "6" in FIG. 3.

As best shown in FIGS. 2 and 3, each key 59 is disposed on the fore end of an associated input arm shaft 64. As best shown in FIGS. 2, 3 and 6, in proximity to its aft end, each input arm shaft 64 includes a through opening 64a for rotatable attachment to the rod-like pivot shaft 50. The input arm shafts 64 are spaced from one another along the length of the pivot shaft 50 by means of cylindrical spacers 66 disposed therebetween. The cylindrical spacers 66 may be formed of any suitable material, e.g., plastic, and are sized to enable lateral adjustment of the input arm shafts 64 on the pivot shaft 50 to assure they are accurately spaced from one another to simulate spacing of the keys on the keyboard 24 of the stenographic recording machine 20. Referring now to FIG. 2, the pivot shaft 50 is also provided with grooves (not shown) in which retaining clips 69 are arranged to be disposed. The retaining clips 69, when disposed within the grooves (not shown) of the pivot shaft 50, act to prevent lateral movement of the input arm shafts 64, spacers 66 and output arms 80 in lateral directions along the length of the pivot shaft 50.

Figure 5:
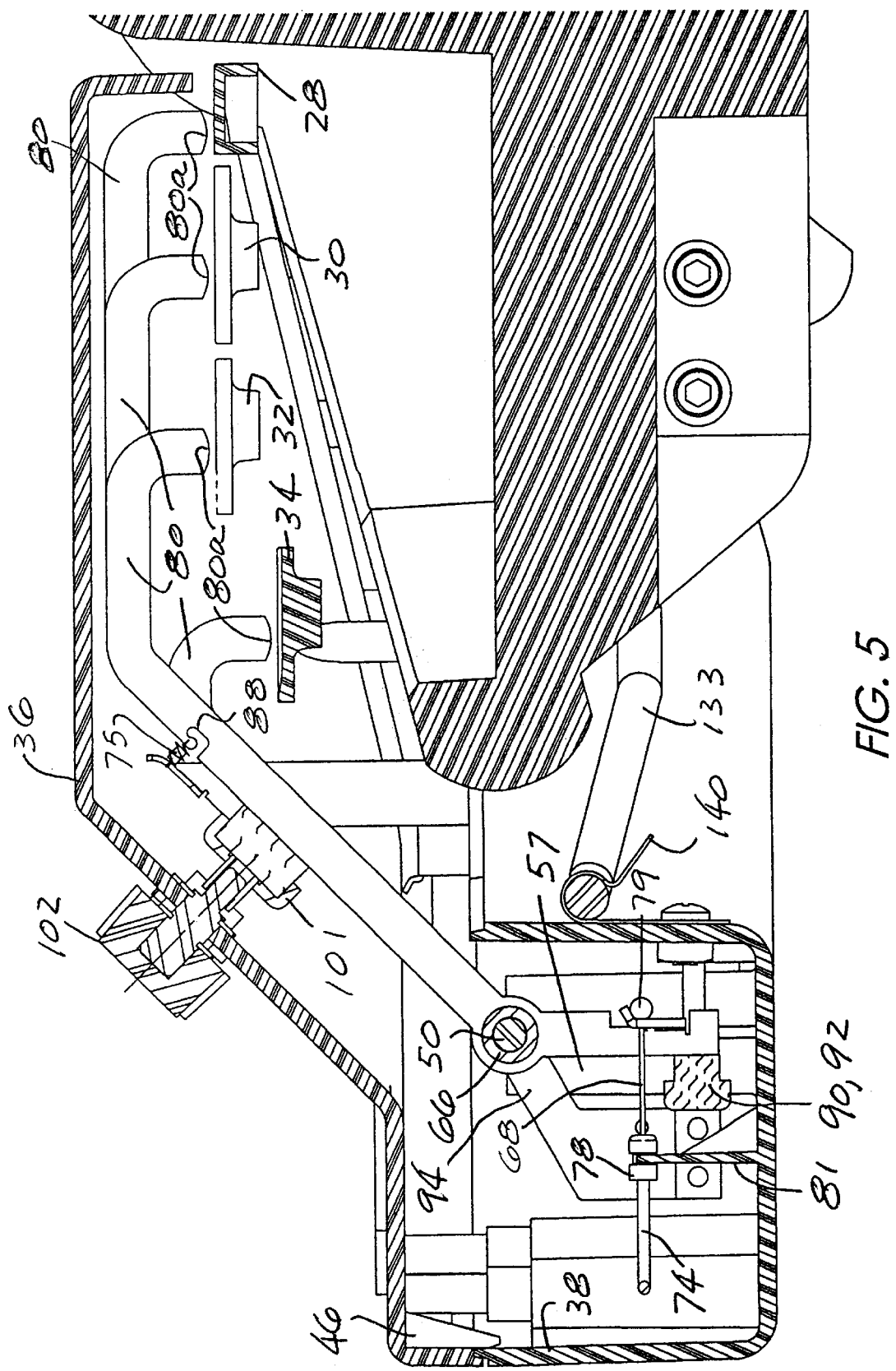
FIG. 5 is a sectional view taken through line 5—5 of FIG. 3.
Figure 7:
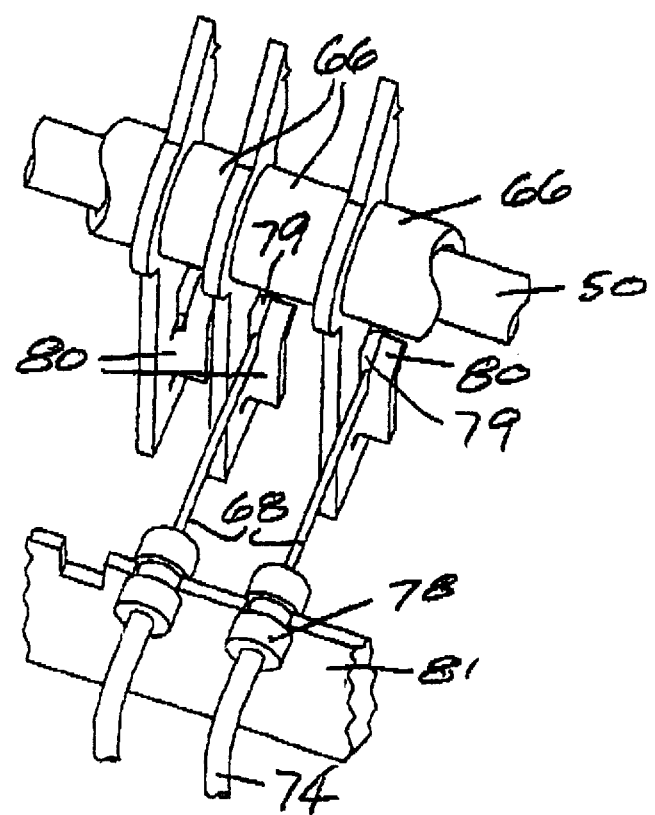
FIG. 7 is a detailed view of the area circled and labeled "7" in FIG. 3.

Referring now to FIGS. 2, 4 and 6, a cable 68 of any suitable diameter, e.g., 0.017 to 0.018 inches in diameter, is connected to the aft end of each input arm shaft 64 by means of a cable stop 70 disposed at one end of each cable 68. Each cable 68 extends through a cable collar 72 and through a sheath 74 which acts to cover and protect the length of the cable 68. The cable collar 72 is secured within a notch formed in a web 73 that is molded into and extends upwardly from the lower shell 38. Referring now to FIGS. 2, 5 and 7, at its second end, each cable 68 extends through a second cable collar 78 and into a cable stop 79 which connects the cable 68 with an output arm 80. The second cable collar 78 is mounted within a notch provided within a web 81 molded into and extending upwardly from the lower shell 38. Referring now to FIGS. 4, 5, 6 and 7, upon depression of the key 59 associated with the cable 68, the sheath 74 and collars 72 and 78 remain stationary and in position while the length of cable 68 between the second cable collar 78 and the output arm 80 decreases thus pulling on the output arm 80 and causing it to rotate downwardly which acts to depress a corresponding key in the second horizontal row 32 on the keyboard 24 of the stenographic recording machine 20. Thus, the cable mechanism described herein works under the same principal as a bicycle brake cable. Although not completely shown in the figures, the remaining keys 59 are connected to the remaining output arms 80 in the same manner.

The right and left sets 60, 62 of input keys are arranged to duplicate the arrangement of the conventional keyboard distribution as is found on the keyboard 24 of the stenographic recording machine 20. As best shown in FIG. 2 and referring now to the right set 60 of input keys and their associated input arm shafts 64, the left-most input arm shaft 64 in the right set 60 includes two arms on a single shaft. Hence, the keys 59a associated with this input arm shaft 64 are tied together to match the manner in which the stenographic recording machine 20 is manufactured. Thus, by depressing either of the keys 59a disposed on this input arm shaft 64, both keys get depressed. Likewise, the right-most and left-most input arm shafts 64 associated with the left set 62 of input keys each have two keys associated with each arm shaft 64. The keys 59b associated with these input arm shafts 64 are also tied together to match the manner in which the stenographic recording machine 20 is manufactured. Further, to duplicate the arrangement of the conventional keyboard distribution as is found on the keyboard 24 of the stenographic recording machine 20, both the left and rights sets 60 and 62 are provided with a number bar 82. As best shown in FIG. 2, the common number bar 82 is mounted to a metal stamping 110 which is secured to a pair of arms 112 by any suitable means, e.g., screws 114. By depressing the number bar 82 while depressing other keys, numbers are printed on the printed medium instead of letters.

Again referring to FIG. 3, the right set 60 of input keys is provided with a right-hand spring support bracket 84 which is disposed over the input arm shafts 64 associated with the right set 60 of keys 59. The right-hand spring support bracket 84 is mounted to upwardly extending bosses 86 molded within the lower shell 38 by any suitable means, e.g., self-tapping screws 87, the bosses 86 having threaded inserts disposed therein. As best shown in FIG. 4, each input arm shaft 64 is provided with a hook 65 to enable attachment to the right-hand spring support bracket 84 by means of an extension spring 75 disposed therebetween. The extension spring 75 may be of any suitable construction, e.g., 0.062 inch diameter music wire and provides spring loading of the keys 59. In particular, after depressing a key 59, the extension spring 75 acts to pull up on the input arm shaft 64 to return it to a position it occupied prior to being depressed so that it is ready for the next actuation during use. Likewise the left set of input keys 62 are provided with a left-hand spring support bracket 85 disposed over the input arm shafts 64 associated with the left set 62 of keys 59 to provide spring-loading for these keys in the same manner as discussed above.

Referring now to FIGS. 3 and 5, the aft ends of the output arms 80 rest against a spring bar 90 having a felt pad 92 which serves as a surface contact material. The felt pad 92 provides two functions: shock resistance and noise reduction. As shown in FIG. 2, the spring bar 90 is mounted within the lower shell 38 by attachment to a bracket 94. As best shown in FIGS. 2 and 5, the bracket 94 is provided with a through opening 94a to enable mounting of the bracket 94 onto the pivot shaft 68. As best shown in FIG. 4, the bracket 94 is mounted within the lower shell 38 using suitable mounting hardware, e.g., screws 97. Referring now to FIGS. 2 and 3, a spring 98 having hooks at its ends is arranged for attachment at one end to an opening in the bracket 94. At its other end, the spring 98 is mounted to a small post 100 (best shown in FIG. 2) molded into and extending upwardly from the lower shell 38. The post 100 is provided with a detent to enable mounting of the spring 98. The spring bar 90 pivots with spring retention on the pivot shaft 50. The felt pad 92 mounted to the spring bar 90 backs up and keeps pressure on the aft ends of the output arms 80. In other words, the felt pad 92 provides resistance against the aft ends of the output arms 80 in response to rotation of the output arms 80 caused by actuation of keys 59. As shown in FIG. 5, at their opposite end, each output arm 80 is provided with a tip 80a arranged for contacting the keyboard 24 of the existing stenographic recording machine 20. The tip 80a of each output arm 80 is provided with a suitable coating, e.g., polyethylene, to reduce noise and prevent marring of the surface of the keyboard 24 of the existing stenographic recording machine 20.

Referring again to FIG. 3, an output spring support bracket 95 is disposed over the output arms 80. The output spring support bracket 95 is mounted to upwardly extending bosses 96 molded within the lower shell 38 by any suitable means, e.g., self-tapping screws, the bosses 96 having threaded inserts disposed therein. As best shown in FIG. 5, each output arm 80 is provided with a hook 88 to enable attachment to the output spring support bracket 95 by means of an extension spring 75 disposed therebetween. The extension spring 75 may be of any suitable construction, e.g., 0.062 inch diameter music wire. After rotation of the output arm 80 in response to actuation of a key 59, the extension spring 75 acts to pull up on the output arm 80 to return it to a predetermined position that is determined by an output arm adjusting plate 101. The output spring support bracket 95 provides the un-actuated output arms 80 with self-tensioning so that the ergonomic keyboard device 10 of the present invention has the same feel as the keyboard 24 of the stenographic recording machine 20. Moreover, the output spring support bracket 95 is provided so that the weight of unactuated output arms 80 will not rest upon the keyboard 24 of the of the stenographic recording machine 20.

As shown in FIGS. 3 and 5, upward movement of the output arms 80 is limited by the output arm adjusting plate 101. The output arm adjusting plate 101 limits movement of the output arms in a similar manner to that in which movement of keys on the keyboard 24 of the stenographic recording machine 20 are limited. The output arm adjusting plate 101 is provided with a control knob 102 which is positioned above the upper shell 36 of the housing 40. The control knob 102 engages the adjusting plate 100 to permit vertical adjustment of the position of the adjusting plate 100 and thus vertical adjustment, i.e., raising and lowering, of the output arms 80 to eliminate any gaps between the output arms 80 and the keyboard 24 of the stenographic recording machine 20 when the ergonomic keyboard is mounted to the existing stenographic recording machine 20. Accordingly, the length of the keystroke is controllable by means of control knob 102 by up to a predetermined amount, e.g., one-quarter of an inch. The adjusting plate 100 is provided to adjust the height of the output arms 80 so that it does not become necessary to adjust the height of the keyboard 24 of the stenographic recording machine 20.

Figure 8:
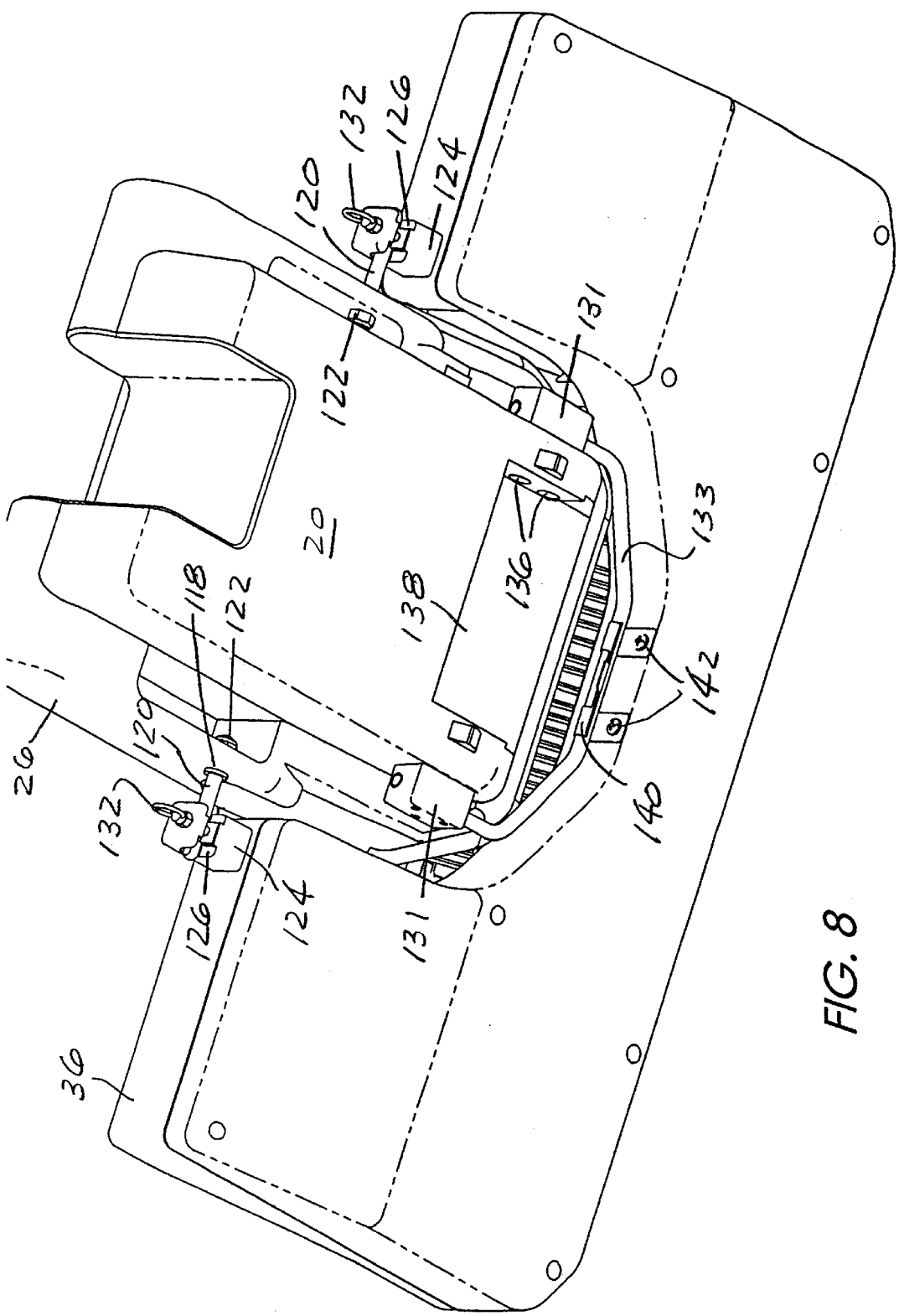
FIG. 8 is an isometric view from below illustrating attachment of the ergonomic keyboard device of the present invention to a stenographic recording machine.

The manner for mounting the ergonomic keyboard device 10 of the present invention over the keyboard 24 of the stenographic recording machine 20 is fully illustrated in FIGS. 2 and 8. In particular, as shown in FIG. 2, holes 116 are opened through side walls on opposite sides of the housing of the stenographic recording machine 20. A bushing 118 is inserted into each hole 116 and provides a through hole through which a latch pin 120 may be inserted. As best shown in FIG. 8, the length of the bushing 118 corresponds to the thickness of the sidewall of the stenographic recording machine 20. Once inserted through the bushing 118, the latch pin 120 is secured to the housing 26 by threading through a lock nut 122 located on the inside of the sidewalls. In FIG. 8, the lock nut 122, bushing 118 and latch pin 120 are shown assembled to the housing 26 so that the entire weight of the ergonomic keyboard device 10 of the present invention can be supported by the latch pins 120 installed onto the housing 26. The latch pins 120 are arranged to accept a latch block 124 having a groove 126, the latch block 124 being attachable to the upper shell 36 (see FIGS. 2 and 4) utilizing suitable hardware, e.g., screws. Each latch block 124 is provided with a spring-loaded pull pin 132 which provides a locking function. That is, the spring-loaded pull pin 132 acts as a gate latch to retain and captivate the latch pin 120 within the groove 126 of the latch block 124. Additional mounting blocks 131 are provided to enable attachment of a clip bar 133 to the housing 26 of the stenographic recording machine 20. Specifically, the clip bar 133 is provided with flat portions 134 to enable attachment of the clip bar 132 to the mounting blocks 131 using suitable mounting hardware 136, e.g., spherical washers and bolts. Specifically, for secure mounting of the mounting blocks 131, the spherical washers are to be located within the housing 26 of the stenographic recording machine 20 and the bolt passed from within the housing 26 and into the blocks 131. As best shown in FIG. 8, the mounting blocks 131 are mounted to the existing stenographic recording machine 20 in the area of the battery compartment 138. All of the mounting hardware 136 for affixing the mounting blocks 131 to the stenographic recording machine 20 is hidden within the battery compartment 138 and does not interfere with insertion or removal of batteries within the battery compartment 138. Once the clip bar 133 and latch pins 120 are installed on the existing stenographic recording machine 20, the ergonomic keyboard device 10 of the present invention is provided with a quick release attachment and removal feature as described above.

Referring again to FIGS. 2 and 8, a spring clip 140 is arranged to be mounted to the lower shell 38 using any suitable hardware, e.g., screws 142. Once mounted, the spring clip 140 is arranged to clip onto the clip bar 133. For mounting the ergonomic keyboard device 10 of the present invention to an existing stenographic recording machine 20, the spring clip 140 mounted to the housing of the ergonomic keyboard device 10 is first clipped to the clip bar 133. Next, the ergonomic keyboard device 10 is rotated downwardly causing the blocks 124 having grooves 126 to come down into position over the latch pins 120 mounted to the side walls of the stenographic recording machine 20. The spring-loaded pull pins 132 may retract under the weight of the ergonomic keyboard device 10 or it may be necessary to pull the pull pins 132 out to allow the latch pins 120 to enter the blocks 124. Once the latch pins 120 are disposed within the blocks 124, the pull pins 132 snap in to lock the latch pins 120 within the latch blocks 124. For detachment, the process is reversed. That is, the spring-loaded pull pins 132 may be pulled out manually allowing the ergonomic keyboard device 10 to be rotated upwardly. Thereafter, the spring clip 140 may be flexed to release the clip bar 133 from the spring clip 140.

As shown in FIG. 1, there are also provided a pair of palm pads 141 located near the proximal edge of the upper shell 36 on the right and left hand sides. These palm pads 141 are shaped and contoured to receive the palms of the hands and thereby to comfortably support the hands during operation of the ergonomic keyboard device 10 of the present invention. The palm pads 141 may be formed of any suitable material, e.g., a dense material, and may be of any suitable thickness, e.g., one-eighth of an inch. Further, by providing a comfortable and convenient rest for the palms of the hands, the palm pads greatly reduce the strain on the user's body of having to hold the hands in an elevated position. Also unlike certain wrist support structures known in the prior art, the palm pad of the present invention does not produce discomfort of the relatively un-cushioned and closely ligamented wrist, but instead supports the hand on the relatively well padded and less sensitive proximal part of the palm, resulting in a much more comfortable and sustainable support.

Although this invention has been illustrated by reference to specific embodiments and variations, it will be apparent to those skilled in the art that various changes and modifications may be made which clearly fall within the scope of the invention.

I claim:

1. An ergonomic keyboard assembly arranged for providing input to an existing keyboard device having a plurality of keys that are moveable relative to a frame, said ergonomic keyboard assembly comprising:
   a. a support surface including means for attaching said ergonomic keyboard assembly to the existing keyboard device;
   b. a plurality of keys mounted to said support surface, said keys being arranged in first and second key sections, said first key section carrying thereon keys adapted for operation by fingers of one of right and left hands of an operator, said first key section being spatially separated from said second key section, said second key section carrying thereon keys adapted for operation by fingers of the other of said right and left hands of said operator; and,
   c. a plurality of actuation mechanisms respectively linked with said plurality of keys mounted to said support surface and having respective tips each driven along a trajectory so as to actuate one of said plurality of keys on said existing keyboard when an associated one of said plurality of keys mounted to said support surface is depressed.

2. The ergonomic keyboard assembly as in claim 1 wherein said support surface comprises a housing including an upper portion, a lower portion, a top surface disposed on said upper portion, a front edge closest to the operator and a rear edge.

3. The ergonomic keyboard assembly as in claim 2 wherein said upper portion of said housing further comprises palm support pads disposed on said top surface and extending towards said front edge for reducing stress and tension.

4. The ergonomic keyboard assembly as in claim 1 wherein said existing keyboard device is a stenographic recording machine.

5. The ergonomic keyboard assembly as in claim 2 wherein each said actuation mechanism comprises an input arm, an output arm and a cable coupling said input arm with said output arm, said tips being integral with each said output arm.

6. The ergonomic keyboard assembly as in claim 1 wherein each said cable comprises a first end and a second end, said ergonomic keyboard assembly additionally comprising cable stops disposed on the first and second ends of said cable.

7. The ergonomic keyboard assembly as in claim 1 wherein said plurality of keys mounted to said support surface are arranged in a plurality of parallel rows.

8. The ergonomic keyboard assembly as in claim 5 additionally comprising an output arm adjusting plate mounted to said lower portion and disposed over said output arms.

9. The ergonomic keyboard assembly as in claim 1 wherein said tip is coated with polyethylene.

* * * * *